(12) United States Patent
Choi et al.

(10) Patent No.: US 9,203,155 B2
(45) Date of Patent: Dec. 1, 2015

(54) METAMATERIAL STRUCTURE AND MANUFACTURING METHOD OF THE SAME

(75) Inventors: Choon Gi Choi, Daejeon (KR); Muhan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 907 days.

(21) Appl. No.: 13/431,102

(22) Filed: Mar. 27, 2012

(65) Prior Publication Data

US 2012/0326944 A1 Dec. 27, 2012

(30) Foreign Application Priority Data

Jun. 27, 2011 (KR) .................. 10-2011-0062508

(51) Int. Cl.
*H01Q 15/02* (2006.01)
*B82Y 20/00* (2011.01)
*C04B 35/00* (2006.01)
*H01Q 15/00* (2006.01)

(52) U.S. Cl.
CPC ............ *H01Q 15/0086* (2013.01); *B82Y 20/00* (2013.01)

(58) Field of Classification Search
None
See application file for complete search history.

(56) References Cited

U.S. PATENT DOCUMENTS

| 2006/0131695 A1* | 6/2006 | Kuekes et al. ............... 257/618 |
| 2009/0040132 A1 | 2/2009 | Sridhar et al. |
| 2010/0271692 A1* | 10/2010 | Hor et al. ....................... 359/356 |

OTHER PUBLICATIONS

Jie Yao et al., "Optical Negative Reraction in Bulk Metamaterials of Nanowires", Science—Brevia, Aug. 15, 2008, pp. 930, vol. 321, Science.

* cited by examiner

*Primary Examiner* — Sheeba Ahmed

(57) ABSTRACT

Provided are a metamaterial structure and a manufacturing method thereof. The metamaterial structure includes a dielectric layer, nanowires penetrating the dielectric layer and arranged in a spacing having negative refraction with respect to an electromagnetic wave incident on the dielectric layer, and coating layers formed between the nanowires and the dielectric layer.

6 Claims, 9 Drawing Sheets

METAMATERIAL STRUCTURE AND MANUFACTURING METHOD OF THE SAME

CROSS-REFERENCE TO RELATED APPLICATIONS

This U.S. non-provisional patent application claims priority under 35 U.S.C. §119 of Korean Patent Application No. 10-2011-0062508, filed on Jun. 27, 2011, the entire contents of which are hereby incorporated by reference. This research was supported by the Nano Material R&D Program (2011-0020206) funded by the Ministry of Science, ICT and Future Planning of Korea.

BACKGROUND

The present invention disclosed herein relates to a metamaterial structure and a manufacturing method of the same, and more particularly, to a metamaterial structure having negative refraction and a manufacturing method of the same.

A metamaterial structure may include an artificial material in which artificial structures are periodically arranged instead of atoms and molecules. A metamaterial may have inner structures much greater than molecules. Therefore, the path in which an electromagnetic wave incident on the metamaterial structure progresses may be interpreted by macroscopic Maxwell equations. On the other hand, the inner structures of the metamaterial may have a size much smaller than an electromagnetic wave wavelength. Therefore, the metamaterial structure may include structures of shapes and sizes in which macroscopic material response characteristics are determined by means of a spectrum component of a near-field region.

The metamaterial is formed of a typical material such as a conductor or semiconductor, and its collective characteristics are changed by arranging it in extremely small repetitive patterns. Therefore, the metamaterial structure has a negative refractive index different from the progress of electromagnetic waves observed in natural materials having positive refractive indices. The metamaterial may reflect electromagnetic waves in a direction exactly opposite to a direction predicted by Snell's law. When the foregoing characteristics are used, a super lens may be manufactured to have a super high resolution of ⅐ or less of the wavelength of light for overcoming the diffraction limit of a typical optical lens.

The resolution of an imaging system for overcoming a wavelength limit, which is realized by using a metamaterial structure having a negative refractive index, is basically limited by the size of a unit cell constituting the metamaterial structure. There is therefore a great need to manufacture a negative refractive material having smaller unit cells in order to improve the resolution of an imaging system.

SUMMARY

The present invention provides a highly miniaturized metamaterial structure and a manufacturing method of the same.

The present invention also provides a metamaterial structure having finely spaced nanowires and a manufacturing method of the same.

The present invention also provides a metamaterial structure able to increase or maximize productivity and production yield and a manufacturing method of the same.

Embodiments of the present inventive concept provide metamaterial structures including: a dielectric layer; nanowires penetrating the dielectric layer and arranged in a spacing having negative refraction with respect to an electromagnetic wave incident on the dielectric layer; and coating layers disposed between the nanowires and the dielectric layer.

In some embodiments, the nanowires may include carbon nanotubes.

In other embodiments, the carbon nanotubes may be arranged in a rectangular lattice, hexagonal lattice, or random form in the dielectric layer.

In still other embodiments, the coating layers may include at least one metal of silver, gold, aluminum, copper, nickel, platinum, and titanium.

In even other embodiments, the dielectric layer may include at least one of a silicon oxide layer, polymethyl methacrylate, polycarbonate, cycloolefin copolymer, and polyethylene terephthalate.

In other embodiments of the present inventive concept, there are provide methods of manufacturing a metamaterial structure, the method including: forming nanowires on a substrate; forming coating layers outside the nanowires; forming a dielectric layer on the coating layers and the substrate; and separating the substrate from the dielectric layer.

In some embodiments, the forming of the nanowires may include a self-assembly method.

In other embodiments, the self-assembly method may include: forming a first polymer layer having a plurality of holes on the substrate; forming catalyst patterns on the first polymer layer; and growing the nanowires on the catalyst patterns.

In still other embodiments, the forming of the catalyst patterns may include: forming a second polymer layer having pores which expose a portion of the first polymer layer; forming a catalyst layer on the first polymer layer and the second polymer layer; and removing the second polymer layer and the catalyst layer formed on the second polymer layer so as to form the catalyst patterns on the first polymer layer.

In even other embodiments, the pores may be self-aligned by the holes of the first polymer layer through a heat treatment of the second polymer layer formed on the first polymer layer.

In yet other embodiments, the separating of the substrate may include removing the catalyst layer and the first polymer layer.

BRIEF DESCRIPTION OF THE DRAWINGS

The accompanying drawings are included to provide a further understanding of the present inventive concept, and are incorporated in and constitute a part of this specification. The drawings illustrate exemplary embodiments of the present inventive concept and, together with the description, serve to explain principles of the present invention. In the drawings.

DETAILED DESCRIPTION OF THE EMBODIMENTS

Figure 1:
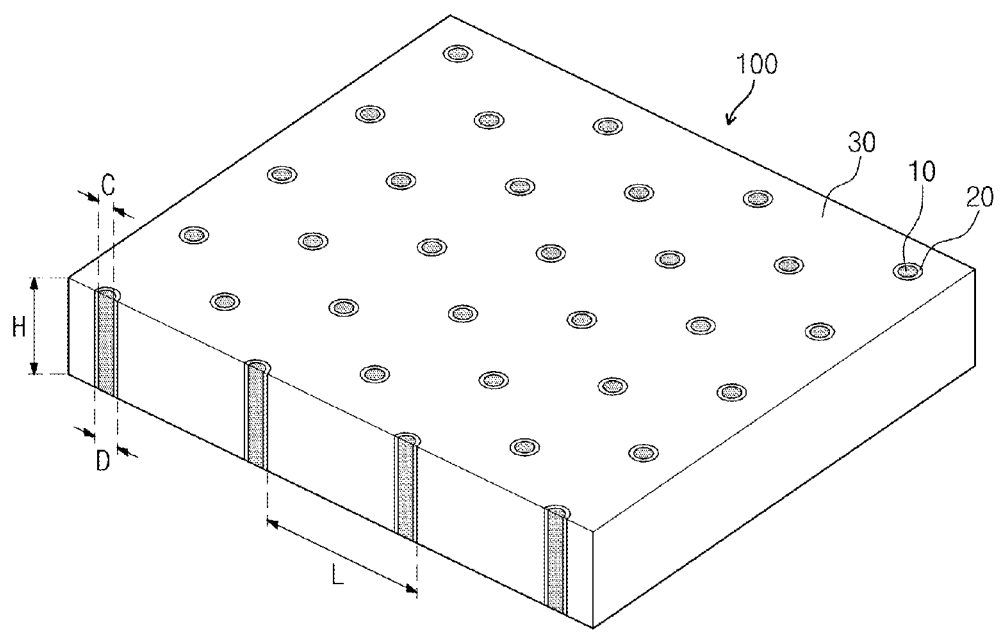
FIG. 1 is a perspective view illustrating a metamaterial structure according to an embodiment of the present inventive concept.

Hereinafter, preferred embodiments of the present inventive concept will be described in more detail with reference to the accompanying drawings. Advantages and features of the present inventive concept, and implementation methods thereof will be clarified through following embodiments described with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. Further, the present inventive concept is only defined by scopes of claims. Like reference numerals refer to like elements throughout.

In the following description, the technical terms are used only for explaining a specific exemplary embodiment while not limiting the present inventive concept. The terms of a singular form may include plural forms unless referred to the contrary. The meaning of "comprises" and/or "comprising" specifies a property, a region, a fixed number, a step, a process, an element and/or a component but does not exclude other properties, regions, fixed numbers, steps, processes, elements and/or components. Since preferred embodiments are provided below, the order of the reference numerals given in the description is not limited thereto.

Figure 2:
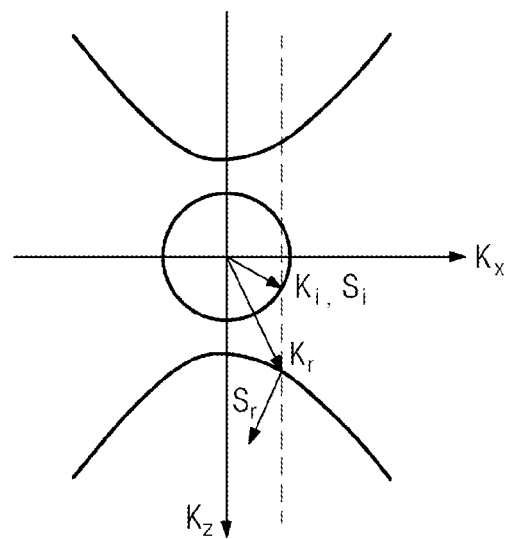
FIG. 2 is a cross-sectional view of FIG. 1.
Figure 3:
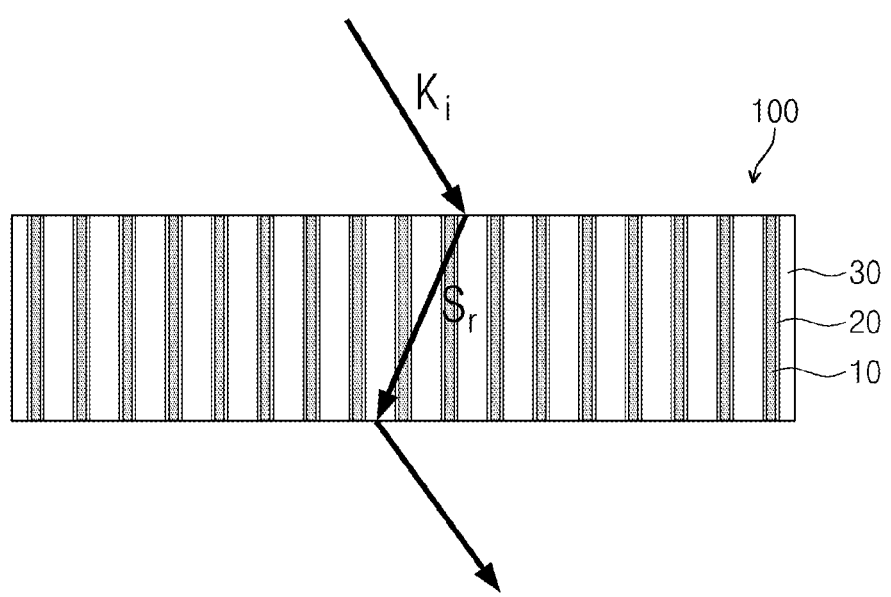
FIG. 3 is a drawing for describing negative refraction characteristics of the metamaterial structures of FIGS. 1 and 2.

FIG. 1 is a perspective view illustrating a metamaterial structure 100 according to an embodiment of the present inventive concept. FIG. 2 is a cross-sectional view of FIG. 1. FIG. 3 is a view for describing negative refraction characteristics of the metamaterial structure 100 of FIGS. 1 and 2.

Referring to FIG. 1, the metamaterial structure 100 according to the embodiment of the present inventive concept may include: nanowires 10 penetrating a dielectric layer 30 and arranged in a spacing L having negative refraction with respect to an electromagnetic wave incident on the dielectric layer 30; and coating layers 20 formed between the nanowires 10 and the dielectric layer 30. The nanowires 10 may include carbon nanotubes. The nanowires 10 may have a diameter C of several nanometers to several tens of nanometers. The spacing L of the nanowires 10 may range from about 20 nm to about 100 nm, and the nanowires 10 may be arranged in a rectangular lattice, hexagonal lattice, diamond lattice, or random form. Therefore, the metamaterial structure 100 according to the embodiment of the present inventive concept may be highly miniaturized because of having finely spaced unit cells.

The coating layers 20 may include at least one metal of silver, gold, aluminum, copper, nickel, platinum, and titanium. The coating layers 20 may have a diameter D of about 3 nm to about 80 nm. The dielectric layer 30 may include at least one of a silicon oxide layer, polymethyl methacrylate, polycarbonate, cycloolefin copolymer, and polyethylene terephthalate. The dielectric layer 30 may have a thickness H of about 300 nm to several tens of microns.

The metamaterial structure 100 may have negative refraction by appropriate combination of type and spacing of the respective nanowires 10 and coating layers 20 penetrating the dielectric layer 30. A progressing path of light incident on the metamaterial structure 100 may be clarified by an effective medium theory (hereinafter, referred to as the "EMT"). The EMT may represent optical characteristics of the dielectric layer 30, the nanowires 10, and the coating layers 20. Light may propagate without energy loss in the metamaterial structure 100 by means of a surface plasmon. The surface plasmon may be defined as a near field in which a collective excitation phenomenon of surface electrons generated at an interface between the coating layers 20 and the dielectric layer 30 is quantized. A polarization direction of the near field is transverse magnetic (TM) polarization perpendicular to the interface and may be determined by the resonance of a local near field having a long and strong electromagnetic wave.

First and second surface plasmon resonances (SPRs) may be generated in the metamaterial structure 100. The first surface plasmon resonance may be generated in a direction parallel to the nanowires 10 and the coating layers 20. The second surface plasmon resonance may be generated in a transverse direction. The metamaterial structure 100 may have negative refraction when light having a wavelength greater than the first surface plasmon resonance is incident.

Meanwhile, according to Bruggeman's EMT, when the nanowires 10 and the coating layers 20 having a permittivity of less than zero penetrate the dielectric layer 30 having a permittivity of greater than zero, an effective permittivity in a horizontal direction parallel to the nanowires 10 and an effective permittivity in a vertical direction intersecting the nanowires 10 near a long-wavelength region may be expressed as Equation 1.

$$\varepsilon_{\parallel} = p\varepsilon_m + (1-p)\varepsilon_d \qquad \text{[Equation 1]}$$
$$\varepsilon_{\perp} = \varepsilon_d + \frac{p\varepsilon_d(\varepsilon_m - \varepsilon_d)}{\varepsilon_d + (1-p)(\varepsilon_m - \varepsilon_d)q_{\mathit{eff}}}$$

where $\in_{\parallel}$ is an effective permittivity in a horizontal direction, $\in_{\perp}$ is an effective permittivity in a vertical direction, $\in_m$ is an effective permittivity of the nanowires 10 and the coating layers 20, $\in_d$ is an effective permittivity of the dielectric layer 30, P is a volume fraction of the nanowires 10 and the coating layers 20, and $q_{\mathit{eff}}$ may correspond to ½ near the long-wavelength region.

Both effective permittivities in horizontal and vertical directions of a general medium may have a value greater than zero. Light may propagate in the general medium according to a circular or elliptical dispersion equation. Most of mediums exist in nature may have a positive refractive index. A refractive index is defined as a ratio between the speed of an electromagnetic wave in a medium and the speed of the electromagnetic wave in vacuum. Square of the refractive index may correspond to permittivity. The permittivity may correspond to a square root of the refractive index.

On the other hand, the metamaterial structure 100 may have the effective permittivity in a parallel direction smaller than zero ($\in_{\parallel}(\in_x, \in_y)<0$) and the effective permittivity in a vertical direction greater than zero ($\in_{\perp}(\in_{\parallel})>0$). The effective permittivity in a parallel direction may become less than zero by adjusting thicknesses and spacings (adjustment of volume fractions) of the nanowires 10 and the coating layers 20. Light may propagate in the metamaterial structure 100 according to a hyperbolic dispersion equation. The hyperbolic dispersion equation is expressed as Equation 2.

$$\frac{k_z^2}{\alpha^2} - \frac{k_x^2}{\beta^2} = 1 \qquad \text{[Equation 2]}$$

where $k_x$ is a light velocity parameter in an x-direction corresponding to a transverse direction, and $k_z$ is a light velocity parameter in a z-direction corresponding to a longitudinal direction. α and β are constants.

Referring to FIGS. 2 and 3, light propagating in air may propagate according to a hyperbolic dispersion equation from a circular dispersion equation while maintaining an x-component of a momentum vector at an interface of the metamaterial structure 100. Herein, $k_x$ is a light velocity axis in the x-direction and $k_z$ is a light velocity axis in the z-direction. $k_i$ is a velocity vector of light incident on the metamaterial structure 100 and $S_i$ is a group velocity vector of light incident on the metamaterial 100. The velocity vector and group vector of light outside the metamaterial structure 100 are the same. $k_t$ is a velocity vector of light in the metamaterial structure 100 and $S_r$ is a group velocity of light in a metamaterial. The velocity vector and group vector of light in the metamaterial structure 100 may be different from each other. The group velocity ($S_r$, direction vector) of light in the metamaterial structure 100 may move to a negative refraction direction.

Therefore, the metamaterial structure 100 according to the embodiment of the present inventive concept may have negative refraction.

A method of manufacturing the metamaterial structure will be described below.

FIGS. 4 through 10 are perspective views illustrating a method of manufacturing a metamaterial structure according to an embodiment of the present inventive concept.

Figure 4:
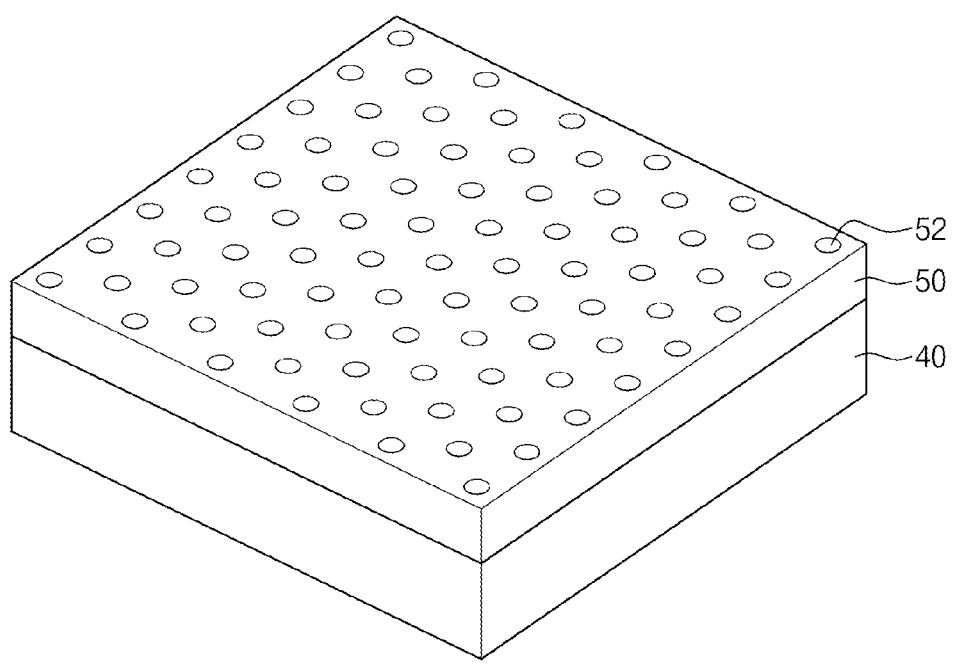
FIGS. 4 through 10 are perspective views illustrating a method of manufacturing a metamaterial structure according to an embodiment of the present inventive concept.

Referring to FIG. 4, a first polymer layer 50 is formed on a substrate 40. The substrate 40 may include a silicon wafer or silicon on insulator (SOI) substrate, and a polydimethylsiloxane (PDMS) substrate. The first polymer layer 50 may include a first block copolymer such as phenylethyltrichlorosilane (PETS) and polystyrene-random-methyl methacrylate (PS-r-PMMA). Also, the first block copolymer may include a monomolecular layer or silicon oxide ($SiO_2$) layer. The first polymer layer 50 may include holes 52. The holes 52 may be locally formed on the first polymer layer 50. The holes 52 may be patterned by photolithography and etching processes of the first polymer layer 50. The photolithography process may include forming a photoresist pattern exposing a portion of the first polymer layer 50. The etching process may include an $O_2$ plasma reaction, in which the photoresist pattern is used as an etch mask to remove the portion of the first polymer layer 50.

Figure 5:
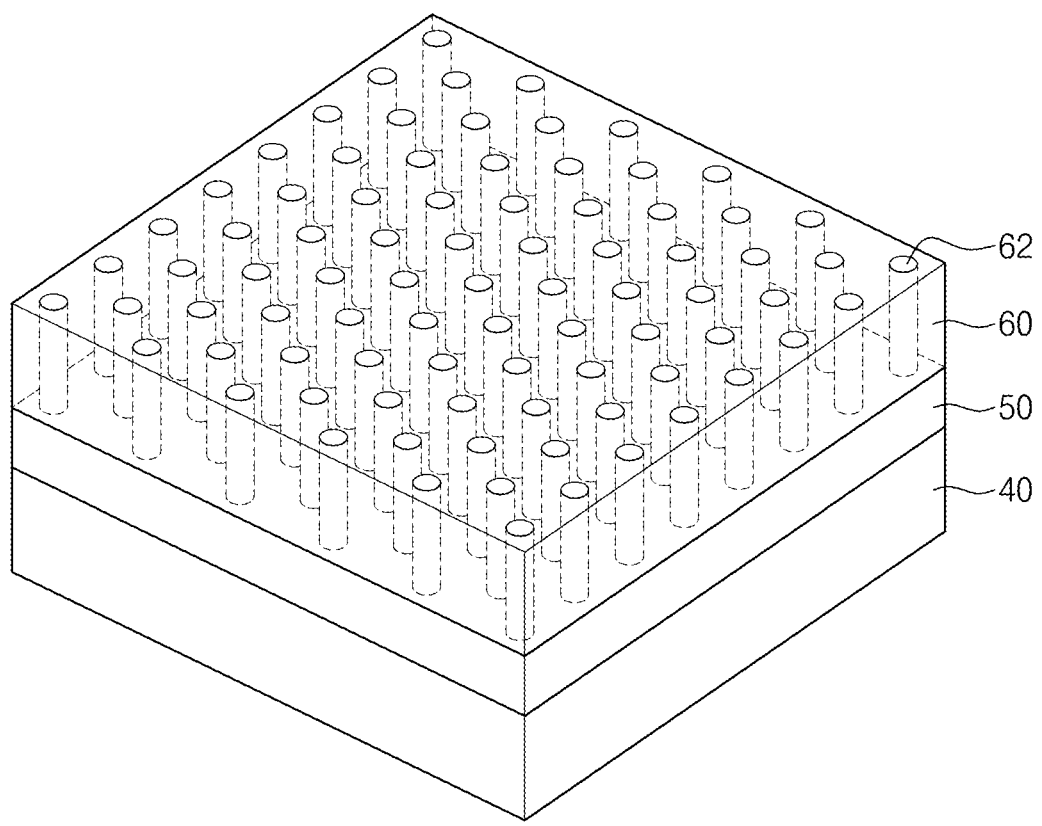

Referring to FIG. 5, a second polymer layer 60 having pores 62, which expose the portion of the first polymer layer 50, is formed. The second polymer layer 60 may include polystyrene-block-methyl methacrylate (PS-b-PMMA) formed on the first polymer layer 50 by a spin coating method. The second polymer layer 60 may have the pores 62 self-aligned on the holes 52 of the first polymer layer 50 by means of a heat treatment of a PS-b-PMMA solution. The pores 62 may partially expose the first polymer layer 50 at bottoms of the holes 52.

Also, the second polymer layer 60 may include a photoresist pattern formed by a photolithography process. The second polymer layer 60 may be patterned by a photolithography process without the holes 52 of the first polymer layer 50.

Figure 6:
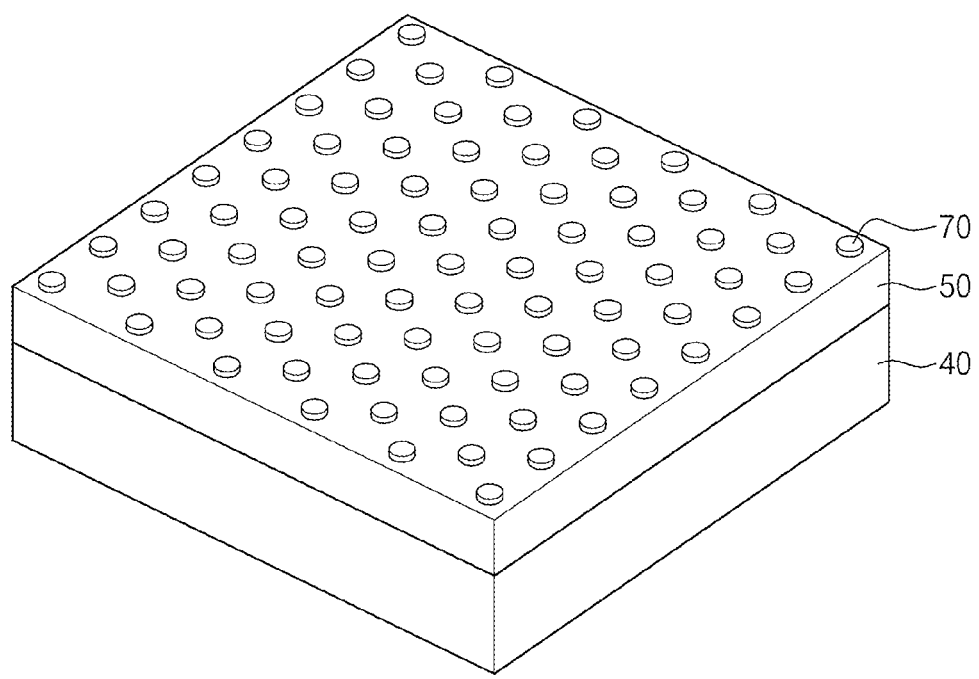

Referring to FIG. 6, catalyst patterns 70 are formed on the first polymer layer 50 exposed by the pores 62 of the second polymer layer 60 and the second polymer layer 60 is removed. A catalyst layer (not shown) formed on the first polymer layer 50 and the second polymer layer 60 is formed and then the catalyst patterns 70 may be formed by lift-off of the catalyst layer and the second polymer layer 60. The catalyst patterns 70 may include iron (Fe). The catalyst patterns 70 may bury the holes 52 of the first polymer layer 50.

Figure 7:
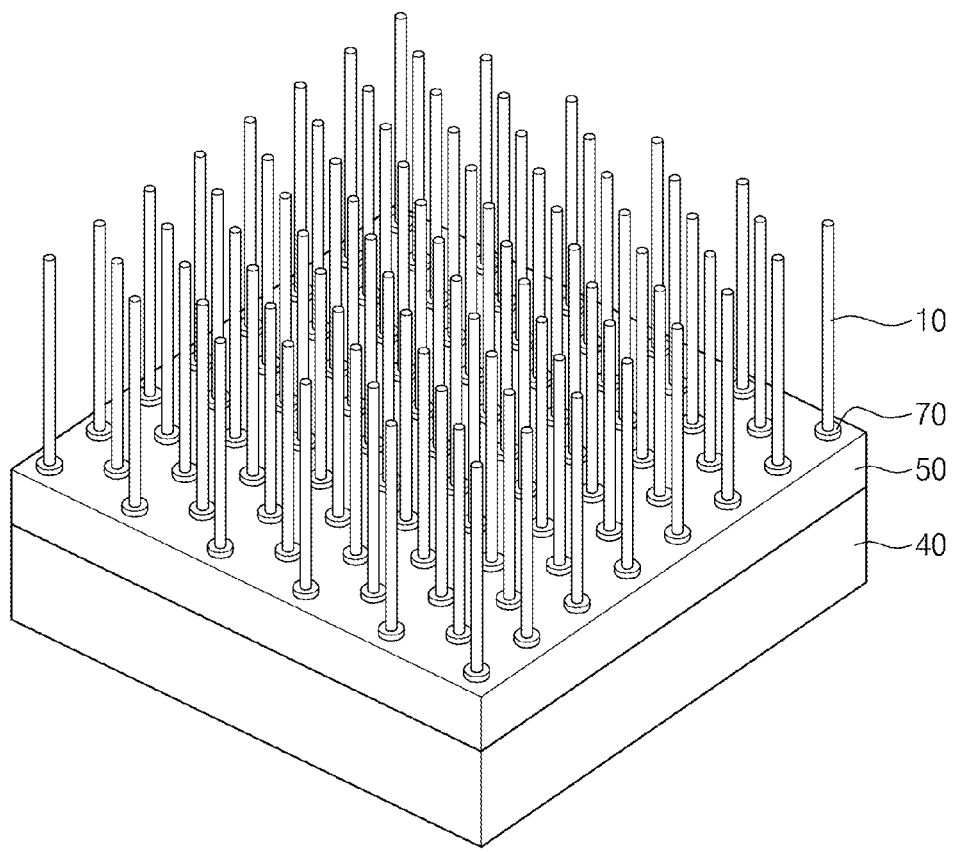

Referring to FIG. 7, nanowires 10 are formed on the catalyst patterns 70. The nanowires 10 may include carbon nanotubes. The nanowires 10 may be selectively grown on the catalyst patterns 70 by a self-assembly method. The self-assembly method may superbly and easily form the nanowires 10 into a microstructure in comparison to a typical top-down method.

Therefore, the method of manufacturing the metamaterial structure 100 according to the embodiment of the present inventive concept may increase or maximize productivity and production yield.

Figure 8:
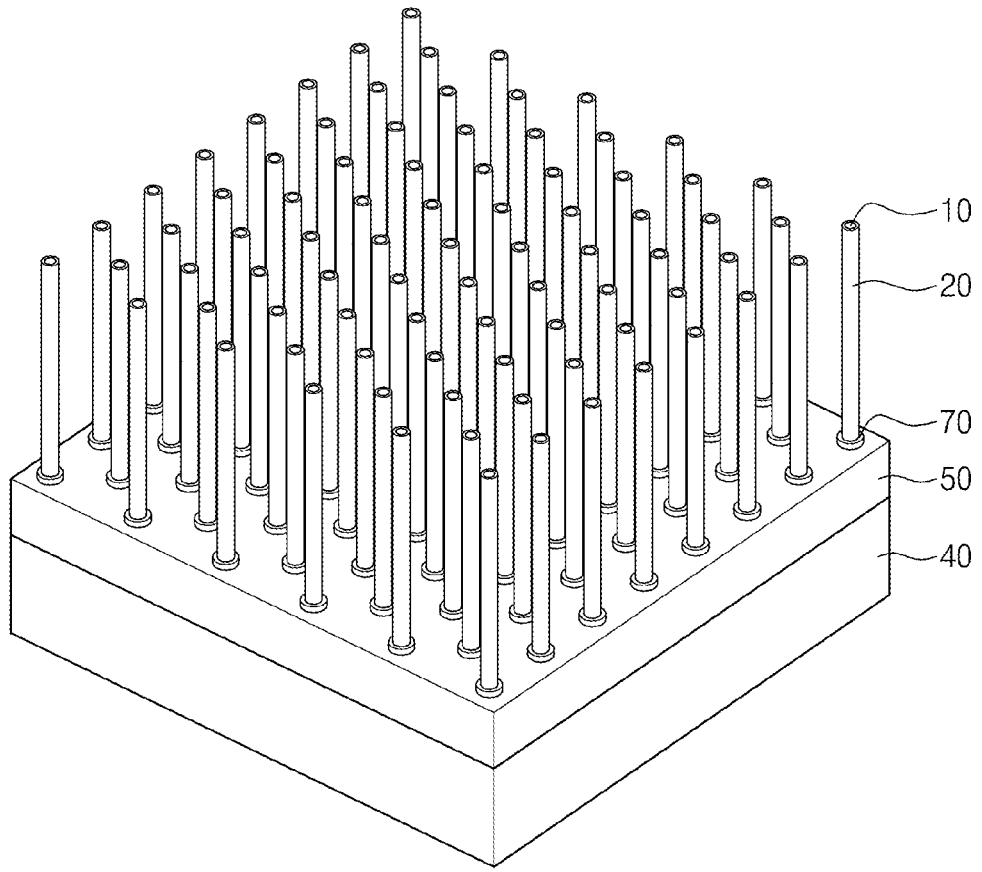

Referring to FIG. 8, coating layers 20 are formed on the nanowires 10. The coating layers 20 may include at least one metal of silver, gold, aluminum, copper, nickel, platinum, and titanium. The nanowires 10 and the first polymer layer 50 may be coated with the metal by at least one method of a physical vapor deposition method, a chemical vapor deposition method, and an atomic layer deposition method.

Figure 9:
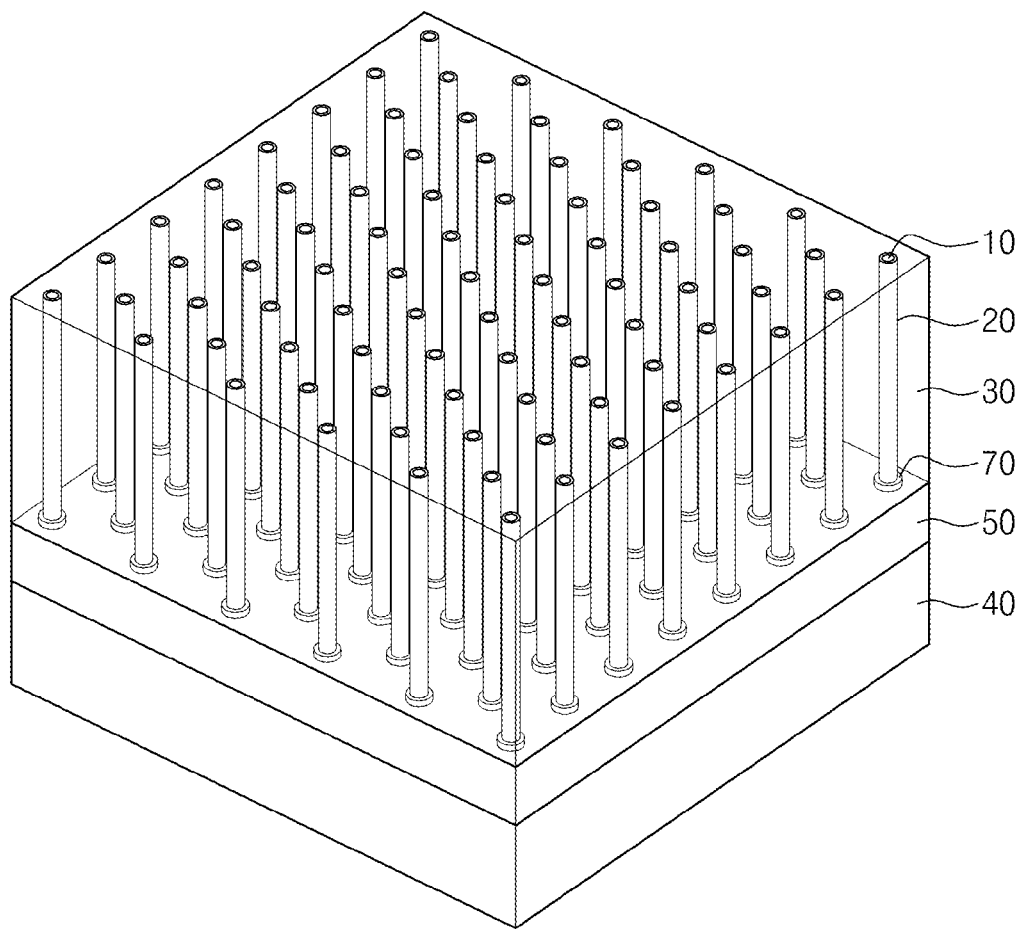

Referring to FIG. 9, a dielectric layer 30 burying the nanowires 10 and the coating layers 20 are formed. The dielectric layer 30 may be formed by a spin coating method, a chemical vapor deposition method, and a physical vapor deposition method. The dielectric layer 30 may include polymethyl methacrylate, polycarbonate, cycloolefin copolymer, and polyethylene terephthalate, which have excellent flexibility. Also, the dielectric layer 30 may include at least one of a silicon oxide layer, an aluminum oxide layer, a titanium oxide layer, or a magnesium fluoride layer. The dielectric layer 30, the nanowires 10, and the coating layers 20 may be planarized by a chemical mechanical polishing method.

Figure 10:
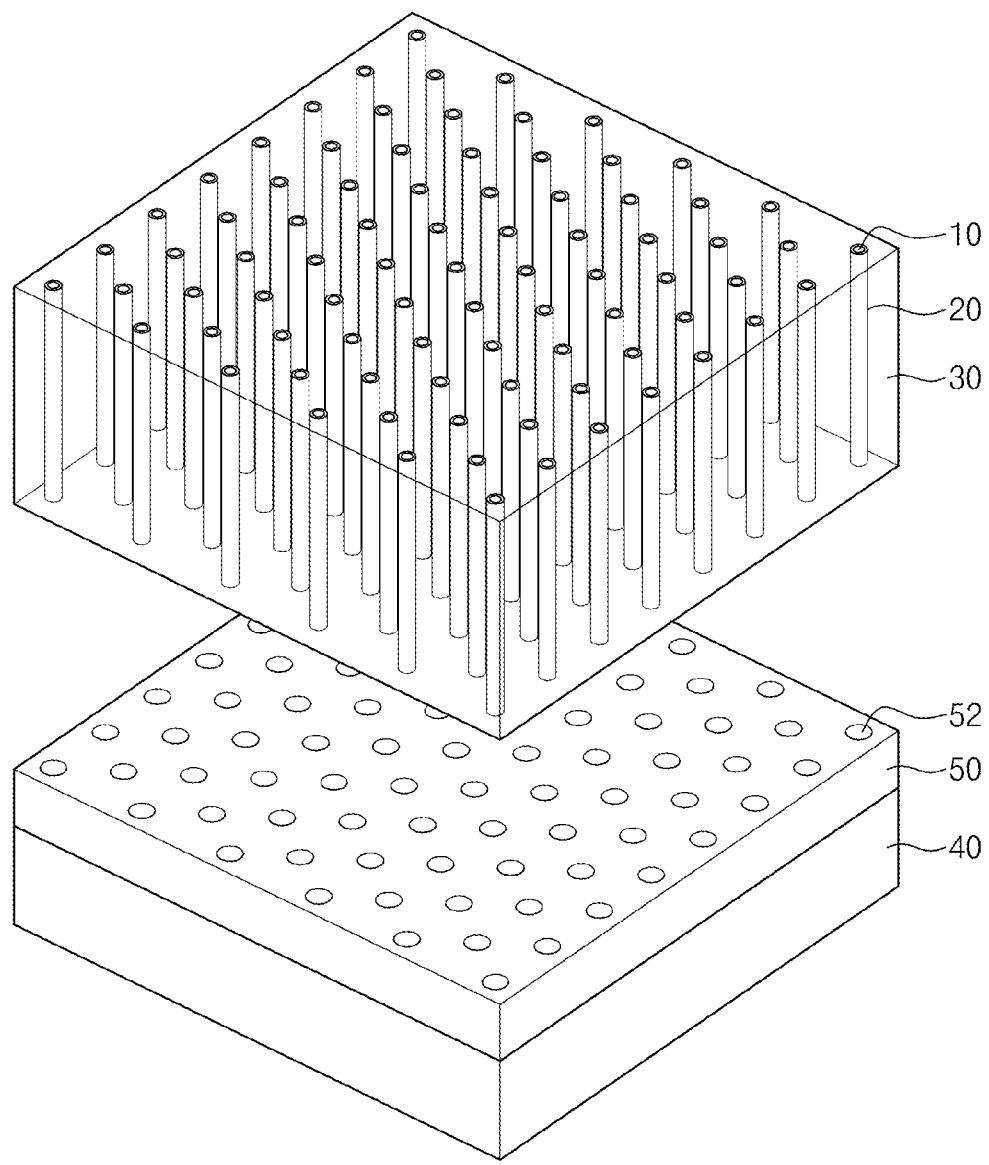

Referring to FIG. 10, the first polymer layer 50 and the substrate 40 may be separated from the dielectric layer 30. The first polymer layer 50 may be selectively removed from the dielectric layer 30 by an etching solution (not shown). The substrate 40 may be crushed.

Eventually, the method of manufacturing the metamaterial structure 100 according to the embodiment of the present inventive concept may increase or maximize production yield and productivity.

As described above, the metamaterial structure according to the embodiment of the present inventive concept may include nanowires penetrating a dielectric layer, and coating layers formed between the nanowires and the dielectric layer. The nanowires may include carbon nanotubes. The coating layers may include a metal. The coating layers may surround the nanowires. The nanowires and the coating layers may be arranged in the dielectric layer in a spacing having negative refraction. Therefore, the metamaterial structure according to the embodiment of the present inventive concept may increase or maximize productivity and production yield.

While the present invention has been particularly shown and described with reference to exemplary embodiments thereof, it will be understood by those of ordinary skill in the art that various changes in form and details may be made therein without departing from the spirit and scope of the present inventive concept as defined by the following claims. Thus, the above-disclosed subject matter is to be considered illustrative, and not restrictive.

What is claimed is:

1. A method of manufacturing a metamaterial structure, the method comprising:
    forming nanowires on a substrate, the nanowires including carbon nanotubes;
    forming a plurality of coating layers such that each coating layer of the plurality of coating layers is disposed over an outer surface of a corresponding one of the nanowires, adjacent coating layers being spaced apart from each other by a distance;
    forming a dielectric layer on the coating layers and the substrate; and
    separating the substrate from the dielectric layer,
    wherein the forming of the nanowires comprises a self-assembly method, the self-assembly method comprises:

forming a first polymer layer that has a plurality of holes on the substrate;

forming catalyst patterns on the first polymer layer; and growing each of the nanowires on a top surface of a corresponding one of the catalyst patterns, wherein the forming of the catalyst patterns comprises:

forming a second polymer layer that has pores, each pore exposing a corresponding portion of the first polymer layer;

forming a catalyst layer on the first polymer layer and the second polymer layer; and removing the second polymer layer and the catalyst layer formed on the second polymer layer to form the catalyst patterns on the first polymer layer, wherein the pores are self-aligned by the holes of the first polymer layer through a heat treatment of the second polymer layer formed on the first polymer layer, wherein the second polymer layer includes polystyrene-block-methyl methacrylate (PS-b-PMMA), and wherein the second polymer layer is formed on the first polymer layer using a spin coating method.

2. The method of claim 1, wherein the separating of the substrate comprises removing the catalyst layer and the first polymer layer.

3. The method of claim 1, wherein the distance between the adjacent coating layers is in a range from about 20 nm to about 100 nm.

4. The method of claim 1, wherein the metamaterial structure has a first effective permittivity in a first direction and a second effective permittivity in a second direction perpendicular to the first direction, and wherein the first effective permittivity is less than zero and the second effective permittivity is greater than zero.

5. The method of claim 4, wherein the first effective permittivity is determined by the following equation:

$$\in_{\parallel} = p\in_m + (1-p)\in_d,$$

where $\in_{\parallel}$ is the first effective permittivity, $\in_m$ is an effective permittivity of the nanowires and the coating layers, $\in_d$ is an effective permittivity of the dielectric layer, p is a volume fraction of the nanowires.

6. The method of claim 5, wherein the effective permittivity of the nanowires and the coating layers is less than zero, and the effective permittivity of the dielectric layer is greater than zero.

* * * * *